3,330,810
CROSS-LINKED PLASTICS OBTAINED BY REACTING AN ISONITRILE WITH A POLYCARBOXYLIC ACID

Wulf von Bonin and Ivar Ugi, Leverkusen, Germany, assignors to Farbenfabriken Bayer Aktiengesellschaft, Leverkusen, Germany, a German corporation
No Drawing. Filed July 26, 1963, Ser. No. 297,961
Claims priority, application Germany, Aug. 2, 1962, F 37,500
6 Claims. (Cl. 260—75)

The present invention relates to new cross-linked plastics which have various valuable properties as well as a process for preparing these new cross-linked plastics.

It is already known to cross-linked polymers which contain carboxyl groups by reacting them with polyalcohols. This cross-linking reaction, however, can only be carried out at disadvantageously high temperatures and with long reaction times, or by using catalysts, usually acidic catalysts, which can lead to corrosion and often disadvantageously influence the properties of the cross-linked product. It is also known to cross-link polymers containing carboxyl groups with polyamines. In such a process however, because of salt formation, the cross-linking occurs almost immediately, so that the cross-linking mixtures with adequate standing times cannot be achieved. The same applies in principle to cross-linking polymers containing carboxyl groups with metal oxides, but, however, when using less active metal oxides, heating for undesirably long periods is usually necessary to produce completely cross-linked polymers. Furthermore, the properties of the cross-linked products are frequently disadvantageously influenced by the presence of metal salts.

It has now been found that substances of high molecular weight, which contain carboxyl groups and have a molecular weight of from 500 to 1 million, preferably from 200 to 200,000, which contain at least two carboxyl groups per molecule, can be cross-linked by reacting them with difunctional and/or polyfunctional isonitriles, possibly in the presence of compounds comprising one or more hydroxyl and/or amino groups which can be acylated.

The preferred embodiment of this invention consists in a method for producing cross-linked plastics which is characterized by mixing (A) a carboxylic acid having a molecular weight between 500 and 1 million and having a content of 1–30% by weight of carboxyl groups, with (B) an isonitrile having 2 to 4 isocyano groups and having a maximum molecular weight of about 500, said components being applied in such amounts that the ratio between carboxylic groups and isonitrile groups is within 0.2:1 to 2:1, and heating this mixture to temperatures between 0° C. and 200° C. Another advantageous specific performance of our invention consists in mixing as component (A) a carboxylic acid group containing polymer having a molecular weight of between 2,000 and 200,000 and having a content of 1–30% by weight of carboxyl groups with (B) an diisonitrile having a molecular weight of between 70 and 400, said components being applied in such amounts that the ratio between carboxylic groups and isonitrile groups is within 0.5:1 to 1.5:1, and heating this mixture to temperatures between 15° C. and 150° C.

Suitable as compounds of high molecular weight containing carboxyl groups, within the scope of the present process are polymerization, polyaddition and polycondensation products. As polymerization products, it is possible per se to use any desired homopolymers, or preferably copolymers, graft polymers or graft copolymers obtained by anionic, cationic or radical polymerization. Copolymers or graft copolymers containing carboxyl groups can be produced by processes known per se, by copolymerization, graft polymerization or graft copolymerization of copolymerizable monomers containing carboxyl groups with one or more monomers which are free from carboxyl groups. In addition, carboxyl groups can also subsequently be introduced into a previously-prepared polymer, for example by oxidation, saponification or addition reactions.

The following are examples of copolymerizable monomers containing carboxyl groups:

(a) Polymerizable monocarboxylic acids containing double bonds, for example acrylic, methacrylic or haloacrylic acids, as well as those partially-esterified decarboxylic or polycarboxylic acids which contain double bonds, for example half ester of fumaric or maleic acids, such as dodecyl hydrogen fumarate and cyclohexyl hydrogen maleate and of itaconic acid or monoallyl phthalate.

(b) Dicarboxylic and polycarboxylic acids, for example maleic acid, fumaric acid and itaconic acid.

The following are examples of copolymerization components, free from carboxyl groups:

(a) Polymerizable olefines, such as ethylene, propylene, isobutylene, 1-butene, butadiene or isoprene.

(b) Aromatic vinyl compounds such as styrene or styrenes with substituents on the nucleus or side chains.

(c) Polymerizable vinyl compounds such as methyl vinyl ketone or vinyl ethers of alcohols with 1 to 6 carbon atoms, for example vinyl-n-butyl ether, vinyl phosphonic acid ester, vinyl sulphonic acid ester, vinyl pyrrolidone or vinyl sulphone.

(d) Vinyl esters of monocarboxylic acids with 1 to 20 carbon atoms, such as vinyl acetate, vinyl propionate, vinyl butyrate, vinyl stearate or vinyl benzoate.

(e) Esters and derivatives of acrylic and methacrylic acids, such as the methyl esters, ethyl esters or butyl esters of these acids, acrylamide, methacrylamide or substituted amides or acrylonitrile.

(f) Halogenated olefines such as vinyl chloride, vinylidene chloride or trifluorochlorethylene.

(g) Anhydrides and esters of $\alpha,\beta$-unsaturated acids, such as maleic anhydride and diethyl fumarate.

The following are examples of typical copolymers which can be used within the scope of the present invention:

(1) Copolymers of acrylic or methacrylic acid with styrene, $\alpha$-monoolefines with 2 or 3 carbon atoms, conjugated aliphatic diolefines with 4 to 6 carbon atoms, acrylic or methacrylic acid esters, acrylonitrile, vinyl chloride or acrylamide.

(2) Copolymers of maleic or fumaric acid half esters and $\alpha$-monoolefines with 2 to 4 carbon atoms, conjugated aliphatic diolefines with 4 to 6 carbon atoms, styrene or vinyl acetate.

As has already been mentioned, it is also possible to use copolymers in which the carboxyl groups have subsequently been introduced into the polymer molecule, for example by (a) Saponification of acrylic or methacrylic acid ester homopolymers or copolymers;

(b) Saponification of polymers of acrylonitrile or acrylamide;

(c) By reacting polymers containing hydroxyl groups with dicarboxylic acids or dicarboxylic acid anhydrides;

(d) By grafting polymerizable monomers which contain carboxyl groups, such as acrylic or methacrylic acids, onto polymers such as copolymers of butadiene, or, for example, grafting maleic anhydride onto ethylene-vinyl acetate copolymers, or (e) By addition of thiol-carboxylic acids to polymers containing carbon-carbon double bonds.

Polyaddition or polycondensation products carrying carboxyl groups are also suitable for the present process. More especially to be mentioned as representative polycondensation product are polyesters, i.e. both saturated and unsaturated, unitary or mixed polyesters with two or more free carboxyl groups.

Polyesters of these types are available by known processes from dicarboxylic and polycarboxylic acids and dihydric and/or polyhydric alcohols.

The following are examples of dialcohols and polyalcohols which are suitable for the formation of such polyesters:

Ethylene glycol, diethylene glycol, triethylene glycol, octa-ethylene glycol or polyethylene glycols with molecular weights from 200 to 5000, 1,2- and 1,3-propanediols, monochlorhydrin, polypropylene glycols with molecular weights from 100 to 1000, mixed polyglycols of ethylene oxide and propylene oxide, 1,3- 2,3- and 1,4-butanediols, 1,4-butenediol, polyethers derived from 1,4-butanediol, 1,6- and 2,5-hexanediols, 1,10-decanediol, 2,2-dimethyl-1,3-propanediol, 3-methyl-2,4-pentanediol, octadecene-9, 10 - diol - (1,12), bis-p-(β-hydroxyethoxyphenyl)-2,2-propane, bis-hydroxyethyl hydroquinone, bis-hydroxyethyl-p,p'-dihydrohydroxydiphenylmethane, its alkyl and halogen derivatives, bis-hydroxyethyl-m-toluidine, glycerol, 1,2,4-butanetriol, 1,1,1-trimethylol propane, 1,2,6-hexanetriol, pentaerythritol, mannitol or cane sugar.

As carboxylic acid component in the formation of these polyesters, it is possible, on the one hand, to use unsaturated dicarboxylic and polycarboxylic acids, such as maleic, fumaric or itaconic acids, and on the other hand, saturated aliphatic dicarboxylic acids, such as oxalic, succinic, glutaric, adipic, pimelic, tartaric and tetrapropenyl-succinic acids, γ-thiapimelic acid, aromatic and cycloaliphatic carboxylic acids such as the positional isomers of phthalic acid, the benzene-tricarboxylic acids, the mellitic acids, hexachloroendomethylene tetrahydrophthalic acid, such polycarboxylic acids as those which are obtained by reacting lactones, such as butyrolactone, with aromatic hydrocarbons, such as benzene or naphthalene.

Polyesters of these types can moreover be modified by incorporating monofunctional alcohols, such as methanol, ethanol, propanol, epichlorhydrin and allyl alcohol, but, on the other hand, it is possible also to use as carboxylic acid components for the modification monocarboxylic acids, for example acetic acid, dichloracetic acid, acrylic acid, sorbic acid, linseed oil, fatty acids, levulic acid, diglycolic acid, benzoic acid or 3,4-dichlorobenzoic acid.

The following are examples of polyesters with free carboxyl groups, (a) Polyesters of adipic acid and ethylene glycol, of average molecular weight from 500 to 5000;

(b) Acid polyesters obtained by transesterification of linseed oil with 1,1,1-trimethylol propane and benzene-1,2,4-tricarboxylic acid, and (c) Polyester- and polyether-carboxylic acids, which are obtained from diols or polyols by oxidation or by reaction with cyclic carboxylic acid anhydrides or carboxylic acid polyanhydrides.

The following are suitable polyesters for this purpose: adipic acid-ethylene glycol polyesters and adipic acid-diethyleneglycol polyesters with hydroxyl numbers from 25 to 300. The following can be used as polyethers: polyethylene glycol, polypropylene glycol or polytetrahydrofurans with terminal hydroxyl groups and of hydroxyl number 25 to 300. The following can be used as polyethers: polyethylene glycol, polypropylene glycol or polytetrahydrofurans with terminal hydroxyl groups and of hydroxyl number 25 to 300.

The following are suitable acid anhydrides: the anhydrides of succinic, glutaric, maleic, phthalic, hexachlorendomethylene-tetrahydrophthalic, hexahydrophthalic, 1, 2,4-benzene-tricarboxylic pyromellitic, naphthalic and adipic acids and benzalazine-maleic anhydride adduct.

Other suitable carboxylic acids are polycarboxylic acids of molecular weight from 300 to 200,000, for example, polyamides with free carboxyl groups, such as can be obtained, for example, by reacting aliphatic, saturated diamines, such as hexamethylene diamine, with an excess of such aliphatic saturated dicarboxylic acids as succinic, glutaric, adipic and pimelic acids. It is also possible to use polycarboxylic acids, such as are obtained by polymerization or copolymerization of acrylic acid or maleic acid half esters or half amides, or analogous derivatives of itaconic acid, by partial or total saponification of compounds of high molecular weight with ester, amide, cyclic anhydride or nitrile groups, for example partially-saponified polymethyl acrylate of molecular weight 400 to 10,000 with carboxyl numbers from 30 to 300.

Polycondensation products of formaldehyde and phenolcarboxylic acids, such as salicyclic acid, p-hydroxybenzoic acid, resorcinol-carboxylic acid as well as their mixtures with phenols are also suitable as acidic components.

The substances of high molecular weight used for the present process can contain the carboxyl functions either in the form of a salt, for example as ammonium or amine salts, or as free carboxyl groups. It is advantageous to use polymers containing carboxyl groups which have a content of 1 to 30 percent of carboxyl groups.

Aliphatic, aromatic, cycloaliphatic and/or heterocyclic diisonitriles and polyisonitriles can be used as isonitrile components, especially such having a maximum molecular weight of about 500.

Of preferred interest in this connection are isonitriles of low molecular weight, i.e. between about 70 and 400, for example di-(2-methyl-2-isocyanopropyl) carbonate or 1,6 - hexanediisonitrile, 1,4 - cyclohexane - diisonitrile, 2 - methyl - pentenediisonitrile - 2,4, 1 - methyl - 1 - isocyano - 4 - (2' - isocyano - propyl) - cyclohexane, α,α,α', α' - tetramethyl - p - xylylene - αα' - diisonitrile, 2,4-toluylene-diisonitrile, 2,6-toluylene-diisonitrile, 1-methyl-3,5 - diethyl - 2,4 - phenylene - diisonitrile, 1,5 - naphthylene-diisonitrile, 4,4'-diphenylmethane-diisonitrile, 4,4'-diphenylene-diisonitrile, 3,3'-, 5,5' - tetraethyl diphenyl urea - 4,4' - diisonitrile, tri - (2,5 - diethyl - 4 - isocyanophenyl)methane, 3,3' - dichloro - 5,5' - dimethyl - 4,4'-diphenyl - methane - diisonitrile, 3,3' - dimethyl - 5,5'-diethyl - 4,4' - diphenyl - methane - diisonitrile, 3,3'-, 5,5' - tetraethyl - 4,4' - diphenylmethane - diisonitrile and 4-α-isocyanoethyl phenyl isocyanide and water soluble polyisonitriles, such as sodium 1-methyl-3,5-diethyl-benzene-2,4-diisocyanide-6-sulphonate.

The following are suitable as trifunctional and higher-functional isonitriles: o,o',o''-tri(2-isocyano-1 - propyl)-trimethylol propane, o,o',o'',o''' - tetra - (2 - isocyano)-1-propyl) - pentaerythritol, 3,3',3'',5,5',5'' - hexaethyl - 4,4', 4'' - triisocyano - triphenyl phosphate, 3,3',3'' – triisocyano-4,4',4''-trimethyl triphenyl isocyanurate, diphenyl-2,4,4' - triisocyanide, 3,3',5,5' - tetramethyl - diphenyl-methane-2,2',4,4'-tetraisocyanide and polymers and copolymers of methacrylic acid-2-isocyanogen-2-methyl-1-propyl ester.

Liquid polyisonitriles or liquid polyisonitrile mixtures, for example the mixtures of 1-methyl-3,5-diethyl-2,4-phenylene diisocyanide and 1-methyl-3,5-diethyl-2,6-phenylene diisocyanide (in ratios from 1:10 to 10:1) are of particular interest. A specific group of preferred isonitriles containing 2 and 3 isonitrile groupings is the following: 3,3',5,5'-tetraethyl - 4,4' - diphenylmethane - diisocyanide, cyclohexane - 1,4-diisocyanide, 1-methyl-3,5-diethyl-benzene - 2,4-diisocyanide, 1-methyl-3,5-diethyl-2,6-diisocyanide, 1,4-di(isocyanmethyl) - cyclohexane, 1,6-hexanediisocyanide N - methyl-N-di(-3-isocyanopropane)-amine, tri-3-isocyanopropane)-amine, 1,6,11 - triisocyanoundecane and 4,4'-di(isocyanmethyl)diphenylether.

Isonitriles of the foregoing types can be prepared by splitting off water from the corresponding formamides according to the method described by I. Ugi in Chemische Berichte 94, page 2814 (1961).

In principle, it is also possible to employ, within the scope of the present invention, polyisonitriles of high molecular weight, such as those which can be obtained by reacting polymers containing carboxyl groups with excess of diisonitriles or polyisonitriles, possibly in the presence of carbonyl compounds. Compounds such as those which can be obtained by reacting the aforementioned components in the presence of amines (I. Ugi. Angewandte Chemie, 1962, 74, pages 9 to 22) can also be used.

The cross-linking reaction according to the invention can be carried out in various ways.

The reactants, i.e. the polymers carrying carboxyl groups and the isonitriles can, for example, be jointly dissolved in a solvent or melted or rolled together.

To cross-link these components in solution, there can be used organic solvents, for example alcohols, such as methanol, ethanol, n-butanol, ethylene glycol monomethyl ether, ethylene glycol or diethylene glycol, such esters as ethyl acetate, ethylene glycol monomethyl ether acetate and acetoacetic ester, such ethers as diethyl ether, tetrahydrofuran, dioxane or anisole, aldehydes and ketones, which possibly can also participate in the addition, such as isobutyraldehyde, benzaldehyde, acetone, methyl ethyl ketone, methyl isobutyl ketones, methyl benzyl ketone or acetophenones, such hydrocarbons as white spirit or benzene, halogenated hydrocarbons and such inert polar solvents as nitrobenzene, pyridine, dimethyl formamide, dimethyl sulphoxides or mixtures of any of these.

Furthermore, the use of water as solvent is particularly important when water-soluble, or partly water-soluble, materials are reacted with one another. In this respect, there are especially to be mentioned mixtures of water and organic solvents which are completely or partially miscible with water, such as alcohol or acetone.

The proportions of the reactants are such that the ratio of carboxyl groups to isonitrile groups is from 0.2:1 to 2:1, advantageously 0.5:1 to 1.5:1.

The cross-linking according to the invention can expediently be carried out either at low or relatively high temperatures, depending upon the reactivity of the individual reactants and upon the nature of the reaction medium. In general, the reaction temperatures are from 0° C. to +200° C., preferably from +15° C. to +150° C. Higher or lower temperatures can, however, be used in special cases.

It is true that it is not, in principle, necessary to add reaction accelerators, but this is possible. For example, catalytically active compounds i.e. compounds of Mg, Zn, B, Al, Si, Ti, Co or Mn, which can form loose complexes with, for example, boron tri-fluoride etherate, dioctyl-tin dilaurate or tetrabutyl orthotitanate, can be added. By this means, it is sometimes possible to accelerate the reaction, but, in principle, the advantage of the cross-linking according to the invention is that no accelerating substances are needed.

The products of the cross-linking process can vary considerably depending upon the reaction conditions, the reactants and their proportions. A discovery which is particularly interesting is that it is possible to produce solutions or dispersions which contain all reactants but have considerable pot lives, more especially depending upon the concentration of the reactants. For example, it is possible to produce in this way, solutions of the reactants, especially for coatings, lacquers and adhesives, which can be kept over relatively long periods and which substantially cross-link only after the solvent is removed by vaporization or evaporation.

Apart from the reactants indicated above, it is also possible to use, for the process according to the invention, additional substances which improve the properties of the products of the process or influence the reaction conditions of the cross-linking process.

Especially suitable for this purpose are compounds which contain primary or secondary amino groups, hydrazide groups (which perhaps can be substituted) and/or hydroxyl groups, for example: ethylene glycol, propylene glycol, triethylene glycol, glycerol, trimethylol propane, pentaerythritol, cane sugar, amino ethanol, 1,2- and 1,3-amino propanol, 1,3- and 1,4-amino butanol, 2-amino-1,3 - propanediol, n - butylamine, stearylamine, aniline, cyclohexylamine, diethylamine, ethylene diamine, tetramethylene diamine, hexamethylene diamine, triethylene tetramine, hydrazine, dimethyl hydrazine, adipic acid dihydrazide, phenyl hydrazide and benzhydrazide.

The quantities of these added substances should be so chosen that the ratio of carboxyl groups to reactive groups of the added substances is from 0.2:1 to 2:1.

Instead of using one compound with a specific functional group, it is, in principle, also possible to use a mixture of compounds which have the same functional groups, e.g., to use several different carboxylic acids instead of one such acid. This makes it possible to use mixtures of those condensation components which certainly comprise the same functional group, but have different reactivity. Such mixtures can be used when an initial condensate is first of all prepared, which is finally condensed at higher temperatures.

The products obtained in accordance with the process described above can subsequently be cross-linked or vulcanized by known methods, for example by sulphur, formaldehyde, hexamethylene tetramine or polyepoxides as dicumyl peroxide.

The same products can also be added during the polyaddition process. Further cross-linking then takes place by known reactions.

By using reactants which contain phosphorous ester groups or halogens, such as fluorine, chlorine or bromine, it is possible to produce difficultly-flammable polymers.

Auxiliaries and additives, such as stabilizers against the action of light, oxygen, water and chemical dyestuffs, optical brighteners, plasticizers and fillers can be added to the components before cross-linking or can later be incorporated into the synthetic plastics. It is also possible to incorporate dyestuffs, optical brighteners and stabilizers into the macromolecule by way of reactive groups during the cross-linking.

The cross-linking reaction according to the invention can proceed simultaneously with other polycondensation, polyaddition or polymerization reactions. In combination with the isocyanate polyaddition, the process according to the invention makes it possible to build up thermally- and chemically-stable cross-linked plastics, the constitution of which can be determined in advance. Combination with the polycondensation of carboxylic acids, amines or carbonyl compounds and isonitriles, as described in U.S. patent application Serial No. 263,416 and No. 267,909, is also advantageous.

The process is also suitable for the final cross-linking of plastics which contain carboxyl groups, primary or secondary amino groups or isonitrile groups. The functional groups present in the polymer are, in such cases, reacted in accordance with the invention. The result is a cross-linking which thermally is extremely stable and which additionally imparts strength to the structure, because of hydrogen bridges.

The process according to the invention is also suitable for the production of foam materials. As blowing agents, the usual compounds that evolve gas can be used. However, air can be stirred in our low-boiling solvents, such as petroleum ether, can be added. These organic solvents are driven off by steam.

Solutions or emulsions of plastics, such as polyvinyl chloride, polyacrylonitrile, polystyrene, phenol resins or acetyl cellulose, in aqueous, organic or combined aqueous-organic solutions of the components according to the invention are suitable for paints, for coating textiles, leather and paper and in addition, for fixing dyestuffs. Polyaddition takes place and a durable film is obtained.

The products according to the invention constitute synthetic plastics which can be processed in accordance with the methods usual for the processing of such plastics as elastomers, thermoplastics, casting compositions, lacquers and adhesives.

The great variety in the starting materials makes it possible to produce synthetic plastics of very different properties, which can be used for a large number of purposes. Products can be obtained which are characterized by good thermal stability, resistance to solvents, chemicals and oxygen, desirable mechanical properties and processing capacity. In particular, it is possible to produce materials which can be cast and injection moulded, moulding compositions, elastomers and starting materials for fibers and foils. The possibility of subsequently curing by heat some of the products according to the invention is an additional advantage.

The products obtained by the process can be used as lacquers, moulding compositions, adhesives, substitutes for gelatine, textile auxiliaries, foam materials, sealing compounds, coating agents, ion exchangers and for many other purposes.

The parts indicated in the following examples are parts by weight unless otherwise mentioned.

In the examples which follow, the following isonitriles or isonitrile mixtures have been denoted as follows:

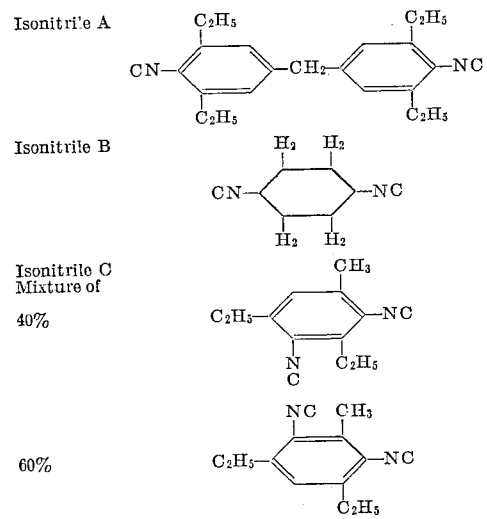

Example 1

100 parts of a copolymer of
93 parts of methyl methacrylate, and
7 parts of acrylic acid
(average molecular weight 80,000; carboxylic groups content 4.35 percent)

are dissolved in 100 parts of ethyl acetate, 16 parts of isonitrile A are added, and the mixture is stirred until a homogeneous solution forms. The solution is cast as a film and then heated for 30 minutes at 130° C. The film, thus treated, is insoluble in ethyl acetate.

Example 2

The procedure and reactants are as indicated in Example 1 but isonitrile A is replaced by 6.7 parts of isonitrile B.

Example 3

The procedure and reactants are as indicated in Example 1, but isonitrile A is replaced by 9.8 parts of the isonitrile mixture C.

Example 4

The procedure and reactants are as indicated in Example 3, but in addition to the isonitrile mixture C, there are also added 5 parts of asymmetrical dimethyl hydrazine and the polymer film is kept for 20 minutes at 120° C. The cross-linked film, which is slightly yellowish in Example 3, is now colorless and is likewise insoluble in ethyl acetate.

Example 5

7 parts of isonitrile B are dissolved in
200 parts of a 50 percent solution of a copolymer of
80 parts of cyclohexyl methacrylate
22 parts of dodecyl methacrylate, and
8 parts of methacrylic acid
(average molecular weight 35,000; carboxylic groups content 3.78 percent)

in white spirit. A film is cast from the solution and, after being completely dried, is heated for 30 minutes at 150° C. The film is thereafter insoluble in white spirit.

Example 6

The procedure and reactants are as indicated in Example 5, but 15 parts of stearylamine are also added to the cross-linking mixture.

Example 7

The procedure and reactants are as indicated in Example 5, except that only 10 parts of the isonitrile C are used and, in addition, 5 parts of ethanolamine are added. The film remains colorless, even when heated for a relatively long time.

Example 8

100 parts of a copolymer of
5 parts of methyl vinyl ketone
5 parts of acrylic acid
25 parts of butyl acrylate, and
65 parts of styrene
(average molecular weight 50,000; carboxylic groups content 3.1 percent)

are dissolved in ethyl acetate, stirred with 7 parts of isonitrile C and a film is cast from the solution. After heating for 30 minutes at 110° C., the film is insoluble in ethyl acetate.

Example 9

6.7 parts of isonitrile B are incorporated by kneading on a kneading machine at 50° C. into 100 parts of an emulsion copolymer which is soluble in dimethyl formamide and which consists of 20 parts of acrylonitrile
72 parts of butadiene, and
8 parts of methacrylic acid
(average molecular weight 500,000; carboxylic groups content 4.1 percent)

A sheet is produced from the mixture and heated for 14 minutes at 100° C. The material is thereafter insoluble in dimethyl formamide, but is merely slightly softened.

Example 10

100 parts of a copolymer of
90 parts of butyl acrylate, and
10 parts of acrylic acid
(average molecular weight 90,000; carboxylic groups content 6.2 percent)

are dissolved in methyl ketone, 30 parts of isonitrile A and 10 parts of n-butylamine are added and the clear solution is cast to form a film. After the film has been heated for 30 minutes at 120° C., it is insoluble in ethyl acetone or acetone.

Example 11

900 parts of a copolymer of
10 parts of acrylic acid, and
90 parts of acrylonitrile
(average molecular weight 80,000; carboxylic groups content 6.2 percent)

are dissolved with 8 parts of isonitrile B in dimethylformamide. The solution is forced through a nozzle into a water bath. The fibrous material which has formed is heated for 15 minutes at 110° C. and is then not dissolved by dimethylformamide, but is only softened.

Example 12

The procedure and reactants are as indicated in Example 11 except that 5 parts of benzhydrazide are also added. As a result the slight discoloration of the cross-linked material in Example 11 is avoided.

Example 13

100 parts of a copolymer of
8 parts of acrylic acid
25 parts of vinyl acetate, and
67 parts of vinyl chloride
(average molecular weight 65,000; carboxylic groups content 5 percent)

are dissolved, with 10 parts of isonitrile C, in tetrahydrofuran and a film is cast from the solution. After heating for 20 minutes at 110° C., the film is insoluble in tetrahydrofuran.

Example 14

100 parts of a copolymer of
20 parts of acrylic acid, and
80 parts of vinyl acetate are dissolved in a mixture of 70 percent methanol and 30 percent acetone and 15 parts of isonitrile C are added. A film cast from the solution is insoluble in acetone, either after heating for 1 minute at 150° C. or after heating for 20 minutes at 100° C.

Example 15

100 parts of a copolymer of ethylene and vinyl alcohol with 9.2 OH and obtained by saponification of an ethylene-vinyl acetate copolymer are dissolved in 500 ml. of tetrahydrofuran and boiled under reflux for 24 hours with 50 parts of succinic anhydride. The polymer is precipitated with water, thoroughly washed and dried.

10 parts of isonitrile B are added to a solution of the dried reaction product in tetrahydrofuran and the clear solution is cast to form a film. After heating for 45 minutes at 120° C., the film is only slightly softened by tetrahydrofuran.

Example 16

13 parts of isonitrile C are incorporated by stirring into 300 parts of an emulsion with 30 percent solids content, which contains a copolymer of 66 parts of styrene
9 parts of methacrylic acid, and
25 parts of butyl acrylate
(average molecular weight 150,000; carboxylic groups content 4.6 percent)

A film is cast from the emulsion and, after drying, is heated for 30 minutes at 120° C. After the heat treatment, the film is insoluble in ethyl acetate, in contrast to a film manufactured from the untreated emulsion.

Example 17

The procedure and reactants are as indicated in Example 16, except that an additional 8 parts of ethanolamine are stirred in the emulsion.

Example 18

100 parts of a copolymer of
10 parts of acrylic acid
10 parts of hydroxypropyl methacrylate, and
80 parts of ethyl acrylate
(average molecular weight 70,000; carboxylic groups content 6.2 percent)

are dissolved, with 18 parts of isonitrile A, in ethyl acetate. A film cast from the solution is insoluble in ethyl acetate after being heated for 25 minutes to 120° C.

Example 19

100 parts of an alternating copolymer of isoprene and cyclohexyl hydrogen maleate are dissolved, together with 20 parts of isonitrile C, in tetrahydrofuran. A film is cast from the solution and heated for 40 minutes to 120° C. The film is then only softened by tetrahydrofuran. (Average molecular weight 45,000; carboxylic groups content 16.8 percent.)

Example 20

The procedure and reactants are as indicated in Example 19, except that 25 parts of isonitrile B are used instead of the isonitrile C.

Example 21

100 parts of a copolymer of
30 parts of vinylidene chloride
60 parts of methyl methacrylate, and
10 parts of methacrylate acid
(average molecular weight 65,000; carboxylic groups content 5.2 percent)

are dissolved with, 9 parts of isonitrile B, in ethylene glycol monomethyl ether acetate. After a film cast from the solution has been heated for 180 minutes to 100° C., it is insoluble in ethylene glycol monomethyl ether acetate.

Example 22

The procedure and reactants are as indicated in Example 21, except that there is additionally included in the cross-linking mixture, 2 parts of a copolymer of 50 parts of methyl methacrylate and 50 parts of methyl vinyl ketone.

Example 23

100 parts of a copolymer of
28 parts of butyl acrylate
8 parts of acrylic acid, and
64 parts of styrene
(average molecular weight 110,000; carboxylic groups content 5.1 percent)

are dissolved in ethyl acetate. 7 parts of isonitrile B and 3 parts of N,N'-diisobutylidene hexamethylene diamine are dissolved in the solution. A film obtained from this solution cross-links as it is dried and, after being kept for 24 hours at 25° C., is not dissolved by ethyl acetate.

Example 24

218 parts of pyromellite anhydride and 2000 parts of adipic acid-ethylene glycol polyester (OH number 56) are reacted while stirring for 8 hours at 125–135° C. After cooling to 20° C. 330 parts of 3,3',5,5'-tetraethyl diphenylmethane-4,4'-diisocyanide are incorporated by rolling. By heating for 4 to 12 hours to 110 to 130° C., a cross-linked elastic synthetic plastic is formed.

Example 25

192 parts of 1,2,4-benzene-tricarboxylic acid anhydride are reacted for 45 hours at 130° C. with 567 parts of a transesterification product of linseed oil and 1,1,1-trimethylol propane (OH number: 99) obtainable by known methods. 134 parts of 1,4-hexane diisocyanide and 3 parts of manganese naphthenate are stirred into the initial product. The product obtained constitutes a lacquer which sets at 20 to 120° C.

*Example 26*

5 parts of isonitrile C are dissolved in 100 parts of a 40 percent solution of a copolymer of 260 parts of styrene
200 parts of butyl acrylate, and
40 parts of acrylic acid
(average molecular weight 55,000; carboxylic groups content 5 percent)

in ethyl acetate. The reaction mixture containing isonitrile is stored at 15° C. and has not cross-linked after 20 days. After 20 days, a film is cast from the solution and, after the solvent has been evaporated, this film is heated for 15 minutes to 100° C. Thereafter, the film does not dissolve in ethyl acetate.

*Example 27*

The procedure and reactants are as indicated in Example 26, but 5 parts of benzhydrazide are added to the cross-linking mixture. The cast film has a slightly less yellowish color after heating, but does not dissolve in ethyl acetate.

*Example 28*

The procedure and components are as indicated in Example 26, except that a copolymer is used which consists of 260 parts of styrene
200 parts of butyl acrylate, and
40 parts of methacrylic acid
(average molecular weight 20,000; carboxylic groups content 4.2 percent)

*Example 29*

The procedure and components are as indicated in Example 28, except that 3 parts of morpholine are added to the cross-linking mixture. The discoloration of the film cross-linked by heating is thus suppressed.

*Example 30*

30 parts of a 40 percent solution of a copolymer of
320 parts of dodecyl methacrylate
363 parts of styrene, and
60 parts of methacrylic acid
(average molecular weight 25,000; carboxylic groups content 5 percent)

in a solvent mixture consisting of 70 parts of white spirit and 30 parts of methyl ethyl ketone are cross-linked with 0.95 part of isonitrile B and the homogeneous solution is cast to form a film. The solvent is allowed to evaporate at room temperature and, after the film has been kept for 40 hours at 23° C., it is insoluble in the solvent mixture originally used.

*Example 31*

30 parts of a 40 percent solution of a copolymer of
330 parts of dodecyl methacrylate
353 parts of styrene, and
60 parts of methacrylic acid
(average molecular weight 30,000; carboxylic groups content 5 percent)

in white spirit are cross-linked with 11.2 parts of a mixture of trifunctional isonitriles, prepared by the Passerini reaction from 1 mol of citric acid, 3 mols of isonitrile C and 3 mols of cyclohexanone, in which the reactants were combined in 70 percent methanolic solution and kept for 20 hours at 45° C. The reaction mixture is cast to form a film and this film, after evaporation of the solvent and heating for 30 minutes at 140° C., is insoluble in benzine, in ethyl acetate and in ethylene glycol monomethyl ether acetate.

*Example 32*

The procedure and reactants are as indicated in Example 31, except that isonitrile A (2 parts) is used as isonitrile.

*Example 33*

The procedure and reactants are as indicated in Example 32, except that isonitrile B (1 part) is used as isonitrile.

*Example 34*

The procedure and reactants are as indicated in Example 31, except that 1.38 parts of isonitrile C are used as isonitrile and, in addition, 3 parts of stearylamine are dissolved in the cross-linking mixture. The cross-linked film is only slightly discolored and is only slightly softened by benzine or ethyl acetate.

*Example 35*

500 parts of a 20 percent solution of an emulsion copolymer of
3 parts of methacrylic acid
17 parts of methyl methacrylate
80 parts of ethyl acrylate
(average molecular weight 190,000; carboxylic groups content 1.56 percent)

in ethyl acetate are mixed with
(a) 2.75 parts of the isonitrile

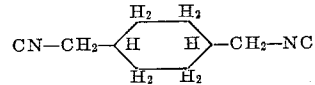

(b) 2.33 parts of the isonitrile

(c) 2.85 parts of the isonitrile

A film is cast from the homogenized solution, and after being dried, is heated for 30 minutes at 100–120° C. Thereafter the film is insoluble in ethyl-acetate.

*Example 36*

250 parts of a 40 percent solution of an alternating structured copolymer of 1 mol of isoprene and 1 mol of maleic acid cyclohexyl-semiester (average molecular weight 45,000, carboxylic groups content 16.87 percent) in chlorobenzene are mixed with 28 parts of the isonitrile

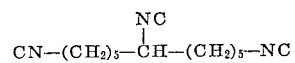

A film is cast from the solution and cross-linked at 110° C. The so obtained film is insoluble in chlorobenzene, ethyl acetate or dimethyl formamide, respectively is only slightly swollen.

*Example 37*

335 parts of a 30 percent solution of a copolymer of
1 part of acrylic acid and
1 part of ethyl acrylate
(average molecular weight 85,000; carboxylic groups content 31 percent)

in dimethyl formamide are mixed with 85 parts of the isonitrile

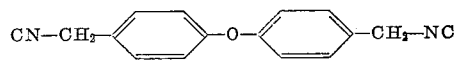

A film is cast after homogenization and, after evaporating the dimethyl formamide, is heated at 130° C. The remaining cross-linked film is insoluble in organic solvents.

*Example 38*

An emulsion copolymer of 20 percent butyl acrylate and 80 percent ethyl acrylate is saponified up to a carboxyl group content of 35 percent by means of aqueous NaOH. The saponification product is precipitated, washed, dried and dissolved in methylene chloride (35 percent solution). 290 parts of this solution were mixed and homogenized with 4.8 parts of the isonitrile

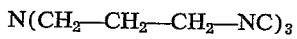

This solution is applied to a nylon-fabric and dried. After 5 minutes heating at 110° C. a cross-linked film has formed which is insoluble in trichloroethylene.

What is claimed is:

1. A method for producing cross-linked plastics which comprises forming a mixture of (A) a compound having a molecular weight of at least 500 and containing at least two carboxyl groups per molecule thereof, said carboxyl groups contributing from 1 to 30 percent by weight of said compound and (B) an isonitrile selected from the group consisting of aliphatic, aromatic, cycloaliphatic and heterocyclic isonitrides having 2–4 isocyano groups per molecule and having a maximum molecular weight of about 500, components (A) and (B) being present in such mixture in such amounts that the molar ratio between carboxyl and isocyano groups is within the range of 0.2:1 to 2:1 and maintaining said mixture at a temperature between 0 and 200° C. to obtain a cross-linked plastic product.

2. The product of the process of claim 1.

3. The method of claim 1 wherein said component (A) is a polyester of a dicarboxylic acid and a dihydric alcohol having a molecular weight between 500 and 5,000.

4. The method of claim 1 wherein component (A) has a molecular weight of at least 2,000, component (B) has a molecular weight of between 70 and 400, said molar ratio range is from 0.5:1 to 1.5:1, and said temperature is between 15 and 150° C.

5. The method of claim 4 wherein said isonitrile is selected from the group consisting of 3,3',5,5'-tetraethyl-4,4' - diphenylmethane - diisocyanide, cyclohexane - 1,4-diisocyanide, 1 - methyl - 3,5 - diethyl - benzene - 2,4-diisocyanide, 1-methyl-3,5-diethyl-2,6-diisocyanide, 1,4-di(isocyanomethyl) - cyclohexane, 1,5 -hexane - diisocyanide, N-methyl-N-di(3-isocyanopropane)-amine, tri-(3 - isocyanopropane) - amine, 1,6,11 - tri - isocyanoundecane and 4,4'-di(isocyanomethyl)-diphenylether.

6. The product of the process of claim 4.

No references cited.

WILLIAM H. SHORT, *Primary Examiner.*

SAMUEL H. BLECH, R. LYON, *Assistant Examiners.*